United States Patent
Schnaibel et al.

(10) Patent No.: US 6,494,036 B2
(45) Date of Patent: Dec. 17, 2002

(54) METHOD FOR OPERATING THE CATALYST OF AN INTERNAL COMBUSTION ENGINE

(75) Inventors: Eberhard Schnaibel, Hemmingen (DE); Andreas Koring, Ludwigsburg (DE); Holger Bellmann, Ludwigsburg (DE); Thomas Wahl, Pforzheim (DE); Andreas Blumenstock, Ludwigsburg (DE); Klaus Winkler, Rutesheim (DE); Frank Stanglmeier, Möglingen (DE); Bernd Schumann, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,671
(22) PCT Filed: Dec. 22, 2000
(86) PCT No.: PCT/DE00/04615
§ 371 (c)(1),
(2), (4) Date: Nov. 26, 2001
(87) PCT Pub. No.: WO01/49995
PCT Pub. Date: Jul. 12, 2001

(65) Prior Publication Data
US 2002/0134077 A1 Sep. 26, 2002

(30) Foreign Application Priority Data
Dec. 31, 1999 (DE) .......................... 199 63 901

(51) Int. Cl.$^7$ ................................................ F01N 3/00
(52) U.S. Cl. ........................... 60/277; 60/276; 60/285; 60/274
(58) Field of Search .................. 60/274, 276, 277, 60/285, 286, 295, 301

(56) References Cited

U.S. PATENT DOCUMENTS

| | | | | |
|---|---|---|---|---|
| 5,201,802 A | * | 4/1993 | Hirota et al. | 60/276 |
| 5,426,934 A | * | 6/1995 | Hunt et al. | 60/277 |
| 5,595,060 A | * | 1/1997 | Togai et al. | 60/274 |
| 6,134,883 A | * | 10/2000 | Kato et al. | 60/277 |
| 6,145,305 A | * | 11/2000 | Itou et al. | 60/277 |
| 6,167,695 B1 | * | 1/2001 | Itou et al. | 60/277 |
| 6,305,160 B1 | * | 10/2001 | Hammerle et al. | 60/277 |
| 6,309,536 B1 | * | 10/2001 | Inagaki et al. | 60/277 |

FOREIGN PATENT DOCUMENTS

| | | |
|---|---|---|
| DE | 199 18 875 | 10/1999 |
| DE | 198 23 923 | 12/1999 |
| EP | 0916941 | 5/1999 |
| EP | 0936349 | 8/1999 |

* cited by examiner

Primary Examiner—Thomas Denion
Assistant Examiner—Tu M. Nguyen
(74) Attorney, Agent, or Firm—Walter Ottesen

(57) ABSTRACT

An internal combustion engine (1), especially for a motor vehicle, is described, which has a catalytic converter (12) which can be loaded with and unloaded of nitrogen oxides. An NOx sensor (14) is provided with which NOx emissions can be measured downstream of the catalytic converter (12). The catalytic converter (12) can be only partially loaded by a control apparatus (18). An increased NOx emission can be generated forward of or in the catalytic converter (12) by the control apparatus (18). A conclusion can be drawn as to the operability of the catalytic converter (12) by the control apparatus (18) from NOx emissions measured downstream.

10 Claims, 2 Drawing Sheets

METHOD FOR OPERATING THE CATALYST OF AN INTERNAL COMBUSTION ENGINE

FIELD OF THE INVENTION

The invention relates to a method for operating a catalytic converter of an internal combustion engine, especially of a motor vehicle, wherein the catalytic converter is loaded with nitrous oxides and unloaded and wherein the NOx emissions downstream of the catalytic converter are measured. Likewise, the invention relates to a control apparatus for an internal combustion engine, especially of a motor vehicle, as well as an internal combustion engine especially for a motor vehicle.

BACKGROUND OF THE INVENTION

A method of this kind, a control apparatus of this kind and an internal combustion engine of this kind are, for example, known for a so-called gasoline direct injection. There, the fuel is injected into the combustion chamber of the internal combustion engine in a homogeneous operation during the induction phase or in a stratified operation during the compression phase. The homogeneous operation is preferably provided for the full-load operation of the engine; whereas, the stratified operation is suitable for idle operation and part-load operation. In a direct-injecting internal combustion engine of the above kind, a switchover takes place between the above-mentioned operating modes, for example, in dependence upon the requested torque.

Especially for carrying out the stratified operation, it is required that a storage catalytic converter be present with which developing nitrogen oxides can be intermediately stored in order to reduce the same during a subsequent homogeneous operation. This storage catalytic converter is loaded in the stratified operation with nitrogen oxides and is again unloaded in the homogeneous operation. An NOx sensor is mounted downstream of the catalytic converter for controlling and monitoring. The NOx sensor is provided for measuring NOx emissions of the discharging exhaust gas.

Parts of the catalytic converter can become defective because of the deterioration thereof or for other reasons.

SUMMARY OF THE INVENTION

It is an object of the invention to provide a method for operating a catalytic converter of an internal combustion engine with which a defect of the catalytic converter can be detected.

This object is solved in accordance with the invention with a method of the kind mentioned initially herein in that the catalytic converter is only partially loaded, that an increased NOx emission is generated in advance or in the catalytic converter and that a conclusion is drawn as to the operability of the catalytic converter from the NOx emissions measured downstream. The object is correspondingly solved with a control apparatus and an internal combustion engine of the respective types mentioned initially herein.

The catalytic converter can reduce the increased NOx emissions generated ahead of or therein via the only partial loading of the catalytic converter. In this way, a lower NOx emission is present at the output of the catalytic converter than the initially generated NOx emission. From this reduction, a conclusion is drawn in accordance with the invention as to the operability of the catalytic converter. If a significant reduction of the initially increased NOx emission is present, then a conclusion can be drawn at least insofar as to a proper operation of the catalytic converter.

The catalytic converter is, however, recognized as being defective when an increased NOx emission is measured. In this case, the initially increased NOx emission was not reduced by the catalytic converter. This defines an operation of the catalytic converter which is not proper.

In an advantageous embodiment of the invention, the increased NOx emission is generated ahead of or in the catalytic converter by a discharge thereof. An increased NOx emission arises from the switchover to the discharge. Since the catalytic converter is not fully loaded, this increased NOx emission arises at the beginning or at least in the interior of the catalytic converter. In this way, for an intact catalytic converter, the increased NOx emission can be reduced again within the catalytic converter itself. There is then no NOx emission or only a very slight NOx emission measured by the NOx sensor at the output of the catalytic converter from which a conclusion can be drawn as to a proper operation of the catalytic converter.

Likewise, it is advantageous, when the increased NOx emission is generated ahead of or in the catalytic converter by: a reduction of the exhaust-gas recirculation rate and/or by an early shift of the ignition time point and/or by a reduction of the fuel pressure. Alternatively or additively, the increased NOx emission can be generated by chemical NOx sources wherein, for example, urea or nitrate is introduced ahead of the catalytic converter. Furthermore, the increased NOx emission can be generated by a spark plug mounted forward of the catalytic converter.

Of special significance is the realization of the method of the invention in the form of a control element which is provided for a control apparatus of an internal combustion engine, especially of a motor vehicle. A program is stored on the control element which can be run on a computing apparatus, especially on a microprocessor, and is suitable for executing the method in accordance with the invention. In this case, the invention is therefore realized by a program stored on the control element so that this control element, which is provided with the program, defines the invention in the same way as the method for whose execution the program is suitable. As a control element, an electric storage medium is especially applicable, for example, a read-only-memory or a flash memory.

Further features, possibilities of application and advantages of the invention will become apparent from the description of the embodiments of the invention which follow and which are shown in the figures of the drawing. All described or illustrated features form the subject matter of the invention individually or in any combination independently of the composition thereof in the patent claims or their dependency as well as independently of their formulation in the description or their illustration in the drawing.

DESCRIPTION OF THE PREFERRED EMBODIMENTS OF THE INVENTION

Figure 1:
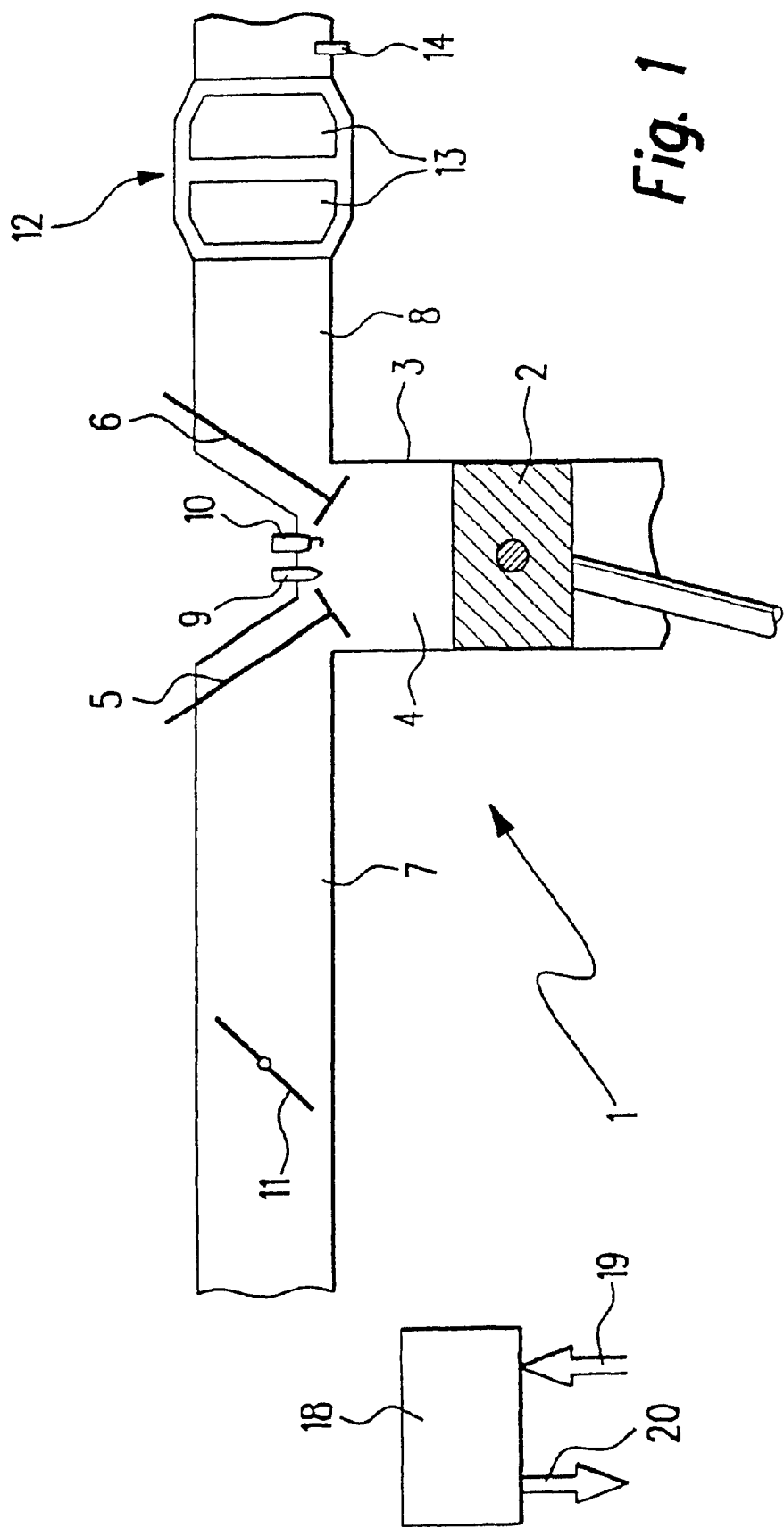
FIG. 1 shows a schematic illustration of an embodiment of an internal combustion engine according to the invention.

In FIG. 1, an internal combustion engine 1 of a motor vehicle is illustrated wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber in the region of the inlet valve 5 and of the outlet valve 6. Fuel can be injected into the combustion chamber 4 via the injection valve 9. The fuel in the combustion chamber 4 can be ignited by the spark plug 10.

A rotatable throttle flap 11 is accommodated in the intake manifold 7 and air can be supplied to the intake manifold 7 via the throttle flap 11. The quantity of the supplied air is dependent upon the angular position of the throttle flap 11. A catalytic converter 12 is accommodated in the exhaust-gas pipe 8 and functions to purify the exhaust gas arising because of the combustion of the fuel.

The catalytic converter 12 is a storage catalytic converter which is combined with a three-way catalytic converter. The catalytic converter 12 is therefore, inter alia, provided for intermediately storing nitrogen oxides (NOx).

The catalytic converter 12 in correspondence to FIG. 1 is assembled from two carriers 13 for the catalytic coating, so-called bricks. An NOx sensor 14 is provided in the exhaust-gas pipe arranged directly downstream of the catalytic converter 12. The NOx emissions in the exhaust gas flowing out of the catalytic converter 12 are measured via the NOx sensor 14.

Input signals 19 are applied to a control apparatus 18 and represent operating variables of the engine 1 measured by means of sensors. The control apparatus 18 generates output signals 20 with which the performance of the engine 1 can be influenced via actuators or positioning devices. The control apparatus 18 is, inter alia, provided for controlling (open loop and/or closed loop) the operating variables of the engine 1. For this purpose, the control apparatus 8 is provided with a microprocessor which has a program stored in a storage medium, especially in a flash memory, which is suitable for carrying out the above-mentioned control (open loop and/or closed loop).

In a first operating mode, a so-called homogeneous mode of the engine 1, the throttle flap 11 is partially opened or closed in dependence upon the desired torque. The fuel is injected into the combustion chamber 4 by the injection valve 9 during an induction phase caused by the piston 2. The injected fuel is swirled by the air inducted simultaneously via the throttle flap 11 and the fuel is thereby distributed essentially uniformly in the combustion chamber 4. Thereafter, the air/fuel mixture is compressed during the compression phase in order to then be ignited by the spark plug 10. The piston 2 is driven by the expansion of the ignited fuel. The arising torque is, in homogeneous operation, dependent, inter alia, on the position of the throttle flap 11. The air/fuel mixture is set as close as possible to lambda=1 for a low development of toxic substances.

In a second mode of operation, a so-called stratified operation of the engine 1, the throttle flap 11 is opened wide. The fuel is injected into the combustion chamber 4 by the injection valve 9 during a compression phase caused by the piston 2. The injection of fuel is local into the immediate vicinity of the spark plug 10 as well as timely at a suitable interval in advance of the ignition time point. The fuel is then ignited with the aid of the spark plug 10 so that the piston 2 is driven in the following work phase by the expansion of the ignited fuel. The developing torque is dependent substantially on the injected fuel mass in stratified operation. The stratified operation is essentially provided for the idle operation and the part-load operation of the engine 1.

The storage catalytic converter of the catalytic converter 12 is loaded with nitrogen oxides during the stratified operation. In the next-following homogeneous operation, the storage catalytic converter is again unloaded and the nitrogen oxides are reduced by the three-way catalytic converter. The storage catalytic converter takes on sulfur during its continuous loading and unloading of nitrogen oxides as a function of time. This leads to a limiting of the storage capability of the catalytic converter which is hereinafter referred to as deterioration.

Figure 2:
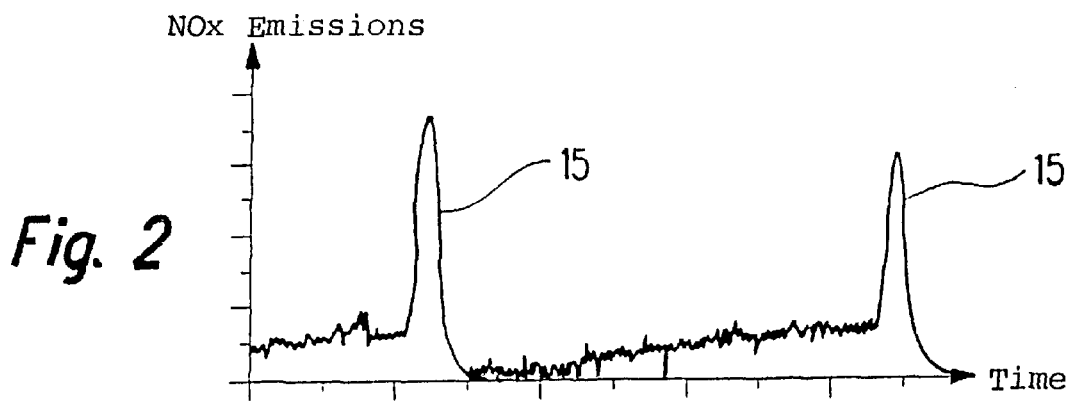
FIG. 2 shows a schematic diagram of the NOx emissions at the output of the catalytic converter of the internal combustion engine of FIG. 1; and, FIGS. 3a and 3b show schematic diagrams of the fill level and of the NOx emissions of the catalytic converter of FIG. 1.

In FIG. 2, the NOx emissions are plotted as function of time as they are measured, for example, by the NOx sensor 14 at the output of the catalytic converter 12. The NOx emissions likewise increase with increasing loading of the storage catalytic converter. The operating mode of the engine 1 is switched over when a pregiven threshold value is reached for which the storage catalytic converter is fully loaded and the storage catalytic converter is, as already mentioned, again unloaded in homogeneous operation.

An increased NOx emission occurs directly after the switchover of the engine 1 into the homogeneous operation. This is identified in FIG. 2 by the reference numeral 15. This increased NOx emission 15 arises because, on the one hand, the storage catalytic converter releases the stored nitrogen oxides because of the homogeneous operation and that, on the other hand, the three-way catalytic converter is not yet in the position to convert the released nitrogen oxides to nitrogen and oxygen. Accordingly, the nitrogen oxides flow unchanged out of the catalytic converter 12 and generate the mentioned increased NOx emission 15.

Figure 3A:
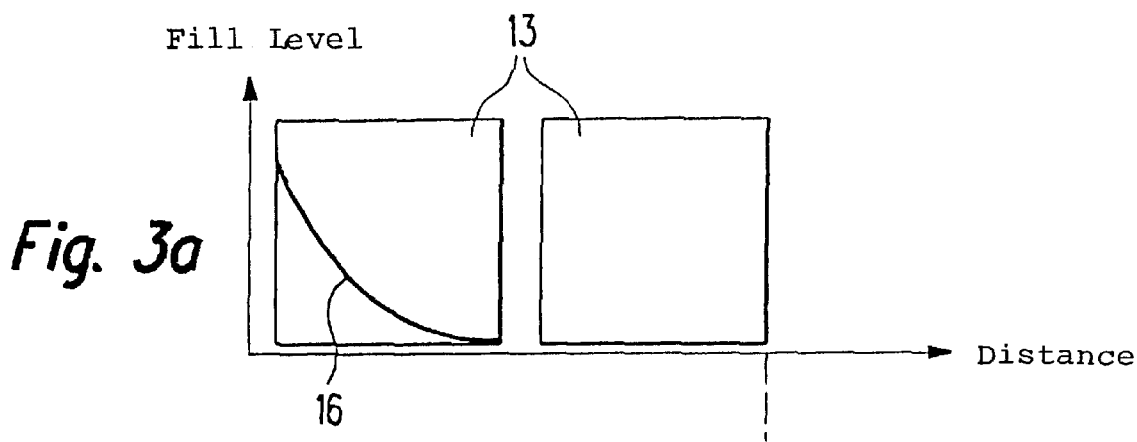

In FIG. 3a, a curve 16 of the fill level state of the catalytic converter 12 is plotted as a function of the distance which the exhaust gas travels in the catalytic converter 12 through the two carriers 13. From the curve 16 of the fill level state it can be seen that essentially only the first one of the two carriers 13 of the catalytic converter 12 in the exhaust-gas direction is partially loaded with nitrogen oxides while the second carrier 13 is unloaded.

When the catalytic converter 12 has a state which corresponds to the curve 16 of the fill level state of FIG. 3a, a transition into the homogeneous operation is carried out by the control apparatus 18. Accordingly, an unloading of the storage catalytic converter is initiated by the control apparatus 18 even though the storage catalytic converter is not yet fully loaded in accordance with curve 16.

For a fully loaded storage catalytic converter, the switchover would have the consequence that an increased NOx emission would be measured at the output of the catalytic converter 12 as shown in FIG. 2. Since, however, the storage catalytic converter is not fully loaded in correspondence to FIG. 3a, this increased NOx emission does not develop at the output of the catalytic converter 12 but essentially only at the start or in the interior of the catalytic converter 12. This results from the situation that the catalytic converter is greatly loaded only at the start in accordance with FIG. 3a.

Figure 3B:
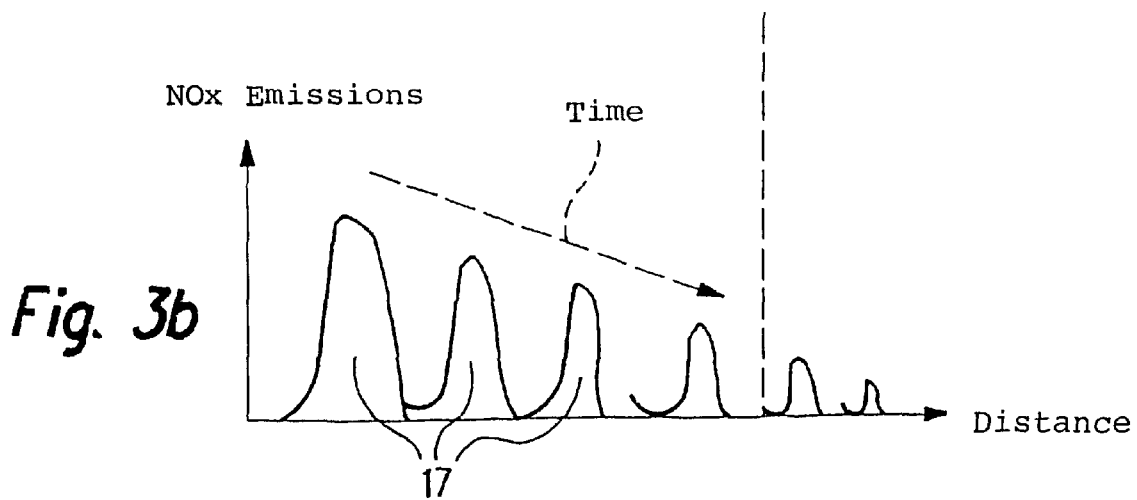

In FIG. 3b, the increased NOx emissions are, on the one hand, plotted as a function of the distance which the exhaust gas travels in the catalytic converter 12 as well as, on the other hand, as a function of the time which the increased NOx emissions need in order to travel the distance through the catalytic converter 12.

As can be seen in FIG. 3b, and as already mentioned, the increased NOx emission is relatively large at the beginning of the catalytic converter 12. This large increased NOx emission passes through the catalytic converter 12 in the direction toward its outlet. Along this path, the increased NOx emission is converted at least partially into nitrogen and oxygen by the three-way catalytic converter. This leads to the situation that, as a function of time and along the exhaust-gas path, the increased NOx emission, which was relatively large at the beginning, is slowly reduced. This is shown in FIG. 3b based on the sequentially increased NOx emissions 17 which become ever smaller.

At the output of the catalytic converter 12 which is shown in FIGS. 3a and 3b by a broken line, a relatively small increased NOx emission leaves the catalytic converter 12. This relatively small increased NOx emission goes almost toward zero in a corresponding selection of the curve 16 of the fill level state.

When both carriers 13 of the catalytic converter 12 are in proper order, then, as described, no or only virtually no increased NOx emission is measured anymore by the NOx sensor 14 at the output of the catalytic converter 12. From this, the control apparatus 18 can conclude as to the proper operation of both carriers 13 of the catalytic converter 12.

If, however, the first carrier 13 of the catalytic converter 12, viewed in exhaust-gas direction, is defective, but the second carrier 13 is in proper order, then the increased NOx emission develops only at the start of the second carrier 13 and can no longer be fully reduced toward zero within the second carrier 13. In this case, an increased NOx emission is measured by the NOx sensor 14 at the output of the catalytic converter 12 from which the control apparatus 18 can conclude the malfunction of at least one of the two carriers 13 of the catalytic converter 12.

The corresponding situation is valid when the first carrier 13 is in proper order but the second carrier 13 is defective. In this case, the increased NOx emission does occur at the beginning of the first carrier 13, but cannot be reduced completely toward zero without the second carrier 13. Therefore, in this case, an increased NOx emission is measured by the NOx sensor 14 at the output of the catalytic converter 12 and, from this fact, the control apparatus 18 can draw a conclusion as to the defect of at least one of the two carriers 13 of the catalytic converter 12.

If both carriers 13 of the catalytic converter 12 are defective, then nothing can be measured by the NOx sensor 14 because no nitrogen oxide was stored in the storage catalytic converter and therefore no increased NOx emission can develop. This case cannot be distinguished from the first explained case wherein both carriers 13 of the catalytic converter 12 are in proper order. For this to be distinguishable, other methods are to be applied which are not described here.

If, proceeding from a fill level state in accordance with FIG. 3a and after a switchover into the homogeneous operation, an increased NOx emission is measured by the NOx sensor 14, then a conclusion can be drawn by the control apparatus 18 from this as to a defect of at least one carrier 13 of the catalytic converter 12.

For detecting the increased NOx-emission, the following can be applied by the control apparatus 18: the maximum value of the NOx emission measured by the NOx sensor and/or the surface under these NOx emissions and/or available time constants of these NOx emissions or the like.

It is understood that the above-described method can also be applied to a catalytic converter which has only a single carrier 13 for the catalytic coating. In this case, because of an increased NOx emission, a conclusion can be drawn as to a defect of at least a part of this catalytic converter 12.

In the described method, the increased NOx emission 15 of FIG. 2 is generated by a switchover into the homogeneous operation. It is likewise possible to generate an increased NOx emission also in other ways. Accordingly, an increased NOx emission can be generated by reducing the exhaust-gas recirculation rate and/or by advancing the ignition time point or by reducing the fuel pressure. Likewise, an increased NOx emission can be generated by chemical NOx sources where, for example, urea or nitrate can be introduced ahead of the catalytic converter 12. Likewise, an increased NOx emission can be generated in that a spark plug, which is mounted ahead of the catalytic converter 12, is correspondingly driven.

What is claimed is:

1. A method for operating a catalytic converter of an internal combustion engine including an internal combustion engine of a motor vehicle, the method comprising the steps of:

generating NOx emissions by operating the internal combustion engine in a lean mode and only partially loading the catalytic converter with NOx emissions;

generating an NOx emission ahead of or in the catalytic converter whereby the generated NOx emission is increased compared to the NOx emissions generated in the lean mode;

measuring NOx emissions downstream of the catalytic converter; and, drawing a conclusion as the operability of the catalytic converter from the NOx emissions measured downstream of the catalytic converter.

2. The method of claim 1, wherein the catalytic converter is detected as being defective when an increased NOx emission is measured.

3. The method of claim 1, wherein the increased NOx emission is generated forward of or in the catalytic converter by an unloading thereof.

4. The method of claim 1, wherein the increased NOx emission forward of or in the catalytic converter is generated by at least one of a reduction of the exhaust-gas recirculation rate, an advancement of the ignition time point and a reduction of the fuel pressure.

5. The method of claims 1, wherein the increased NOx emission is generated by chemical NOx sources.

6. The method of claim 1, wherein the increased NOx emission is generated by a spark plug mounted forward of the catalytic converter.

7. A method for operating a catalytic converter of an internal combustion engine including an internal combustion engine of a motor vehicle, the method comprising the steps of:

only partially loading the catalytic converter with NOx emissions;

generating an increased NOx emission ahead of or in the catalytic converter;

measuring NOx emissions downstream of the catalytic converter;

drawing a conclusion as the operability of the catalytic converter from the NOx emissions measured downstream of the catalytic converter;

wherein the increased NOx emission is generated by chemical NOx sources; and, wherein said chemical sources include urea or nitrate introduced ahead of the catalytic converter.

8. A control element including a flash memory for a control apparatus of an internal combustion engine including an internal combustion engine of a motor vehicle, the control element comprising a program stored thereon which can be run on a computing apparatus including on a microprocessor, and the program is suitable for carrying out a method for operating a catalytic converter of an internal combustion engine including an internal combustion engine of a motor vehicle, the method comprising the steps of:

generating NOx emissions by operating the internal combustion engine in a lean mode and only partially loading the catalytic converter with NOx emissions;

generating an NOx emission ahead of or in the catalytic converter whereby the generated NOx emission is increased compared to the NOx emissions generated in the lean mode;

measuring NOx emissions downstream of the catalytic converter; and, drawing a conclusion as the operability of the catalytic converter from the NOx emissions measured downstream of the catalytic converter.

9. A control apparatus for an internal combustion engine including an internal combustion engine of a motor vehicle, wherein the engine has a catalytic converter which can be loaded with and unloaded of nitrogen oxides and wherein the engine has an NOx sensor with which NOx emissions can be measured downstream of the catalytic converter, the control apparatus comprising:

means for generating NOx emissions by operating the internal combustion engine in a lean mode and only partially loading the catalytic converter with NOx emissions;

means for generating an NOx emission ahead of or in the catalytic converter whereby the generated NOx emission is increased compared to the NOx emissions generated in the lean mode;

means for receiving and utilizing signals from said NOx sensor which represent NOx emissions measured downstream of the catalytic converter; and, means for drawing a conclusion as to the operability of the catalytic converter from the NOx emissions measured downstream.

10. An internal combustion engine including an internal combustion engine for a motor vehicle, the internal combustion engine comprising:

a catalytic converter which can be loaded with and unloaded of nitrogen oxides;

an NOx sensor for measuring NOx emissions downstream of the catalytic converter; and, a control apparatus including: means for generating NOx emissions by operating the internal combustion engine in a lean mode and only partially loading the catalytic converter with NOx emissions;

means for generating an NOx emission ahead of or in the catalytic converter whereby the generated NOx emission is increased compared to the NOx emissions generated in the lean mode; and, means for drawing a conclusion as to the operability of the catalytic converter from the NOx emissions measured downstream.

* * * * *

UNITED STATES PATENT AND TRADEMARK OFFICE
CERTIFICATE OF CORRECTION

PATENT NO.   : 6,494,036 B2
DATED        : December 17, 2002
INVENTOR(S)  : Eberhard Schnaibel et al.

It is certified that error appears in the above-identified patent and that said Letters Patent is hereby corrected as shown below:

Column 6,
Lines 29 and 59, -- to -- should be inserted between "as" and "the".
Line 43, delete "claims" and substitute -- claim -- therefor.

Column 7,
Line 18, -- to -- should be inserted between "as" and "the".

Signed and Sealed this

Twelfth Day of August, 2003

JAMES E. ROGAN
*Director of the United States Patent and Trademark Office*